April 11, 1939.  S. T. WILLIAMS  2,154,255
TIRE VALVE
Filed May 15, 1937
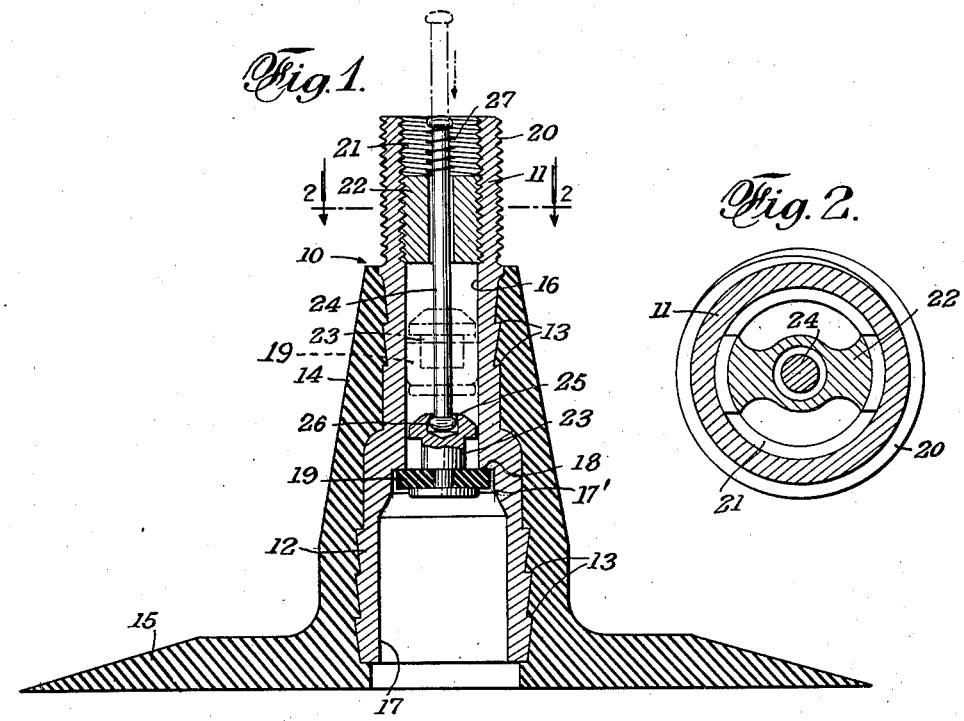
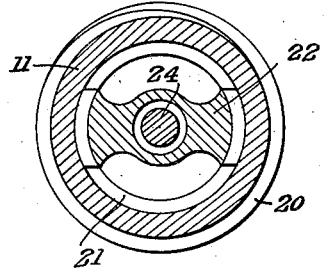
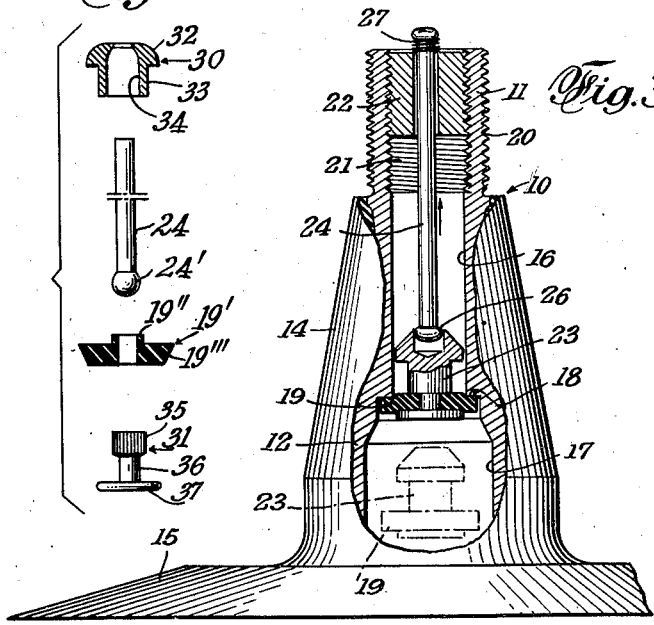
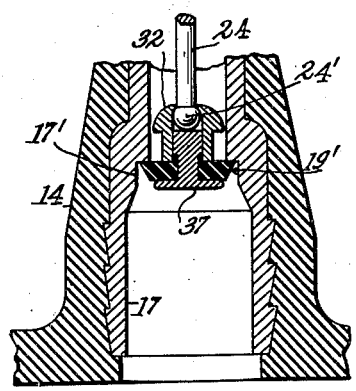
INVENTOR
Selden T. Williams
BY
Fraser, Myers & Manley
ATTORNEYS Patented Apr. 11, 1939

2,154,255

UNITED STATES PATENT OFFICE 2,154,255

TIRE VALVE

Selden T. Williams, Bellerose, N. Y., assignor to Scovill Manufacturing Company, Waterbury, Conn., a corporation of Connecticut Application May 15, 1937, Serial No. 142,742

5 Claims. (Cl. 251—144)

My present invention relates to tire valves, and more particularly to such valves for use on tractor and aeroplane tires, and aims to provide certain improvements therein.

In view of the dimensional limitations of the standard tire valves used on tractor and aeroplane tires of large volumetric capacity, the time for filling or inflating such tires is relatively great. This is particularly true of tractor tires, which are filled with liquid. To speed up such inflating or filling, several practices have been resorted to. For example: (1) it has been proposed to increase the bore diameter of the valve casing to a maximum by elimination of shoulders within such valve stem and use a non-replaceable valve which must be assembled in the casing from the inner end thereof before the casing is attached to the inflatable tube; (2) it has been proposed to add such type of valve mounted within a supplemental valve casing to the standard valve casing; and (3) it has been proposed to omit or remove the valve core or "insides" from the valve casing and rely upon the valve cap as a seal. While these various proposals acknowledgedly do speed up inflation, they are open to one or more objections. For example: Non-replaceable valves have not met with favor in the industry because they necessitate a severance of the valve stem from the inner tube when it becomes necessary to replace a defective valve; a supplemental valve casing increases the cost of the valve and introduces an additional source of leakage therein; the omission or removal of the valve core or "insides" is unsatisfactory because the primary check or seal against leakage is thus destroyed.

To overcome the various objections above recited, and others not specifically enumerated, I have developed a tire valve possessing the dimensional limitations imposed by the trade, comprising a casing having a maximum diameter of bore for promoting the inflating rate therethrough and a special form of replaceable valve core or "insides" for use therewith.

According to my present invention I provide a valve casing having a mouth bore of maximum diameter and an enlarged bore inwardly of said mouth bore, between which bores there is formed a shoulder which serves as a valve seat. Adapted to engage and provide a seal with said valve seat is a special form of valve check which can be inserted through the mouth of the casing but not withdrawn therethrough. Such valve, however, may be replaced, and to accomplish this the check is so mounted with respect to the valve pin that it may be readily severed therefrom and fall into an idle or inoperative position, for example, into the inner tube, whereupon the valve pin may be withdrawn and a new core may be inserted into the casing to take the place of the one rendered inoperative. The invention will be better understood from the detailed description which follows, when considered in conjunction with the accompanying drawing, wherein:

Figure 1 is a longitudinal or axial section through a tire valve embodying my invention.

Fig. 2 is a section taken along the plane of the line 2—2 of Fig. 1.

Fig. 3 is a view similar to Fig. 1, partly in elevation, showing the manner in which the valve check button may be severed from the valve pin.

Fig. 4 is a fractional view similar to Fig. 1, showing a modified form of valve core.

Fig. 5 is a group view of the constituent elements of the valve core shown in Fig. 4.

Referring first to Figs. 1 to 3 of the drawing wherein I have shown my invention as applied to a so-called rubber valve stem, let the reference numeral 10 indicate a metallic valve casing having a mouth or nipple portion 11 and an enlarged body portion 12. The exterior of both the portions 11 and 12 are formed with annular grooves providing ridges 13 for promoting the union of a rubber covering 14 onto the metallic valve casing. The rubber covering 14 may assume any desired form and is here shown as provided with a base flange 15 for directly securing the tire valve to an inner tube.

The mouth or nipple portion 11 has a cylindrical bore 16 extending therethrough of the maximum diameter that can be tolerated without adversely affecting the strength and rigidity of the valve casing. The body portion 12 is formed with a bore 17 of larger diameter than the bore 16, and a connecting bore 17' between which latter and the bore 16 there is formed a flat shoulder 18 which serves as a valve seat for a valve check 19. Preferably the nipple portion 11 at its outer or mouth end is externally screw-threaded, as at 20, to accommodate a conventional inflating coupling or valve cap, and internally screw-threaded, as at 21, for receiving a screw-threaded plug 22 of a valve core or "insides".

The valve core or "insides" according to my invention, as illustrated in Figs. 1 to 3, consists of a button 23 which carries the rubber packing washer or check 19, a valve pin 24 upon which the button 23 is mounted for ready severance, and the valve plug 22. The outer end of the pin is enlarged so that the various valve core parts when mounted on the pin will provide a unit, which, as such, can be inserted into the valve casing. To promote the fluid flow through the tire valve, the plug 22, which has an axial opening therethrough for guiding the valve pin, is made in the form of a relatively thin plate which offers but slight obstruction to the passage of fluid through the mouth of the valve casing. The button 23 has a maximum diameter just slightly less than the diameter of the bore 16 so as to freely pass therethrough, and at its top is formed with an inwardly-directed flange 25 which is lightly closed in over a head 26 at the inner end of the valve pin to provide a swivel connection therewith. Preferably this swivel connection is such as to be readily broken, to separate the button from the pin when force is applied in axial direction tending to break said connection, as will be presently explained. The button between its top and base is formed with a portion of reduced diameter, and directly adjacent the base is formed with an annular groove within which the packing washer or valve check 19 is accommodated. The portion of reduced diameter between the head and base permits the valve check 19 to be cupped therearound, as shown in dotted lines in the upper portion of Fig. 1, in the course of inserting the valve core into the casing.

By referring to Fig. 1 it will be seen that in the course of inserting the valve core into the casing the valve check 19 is cupped around the reduced portion of the button 23, and in said condition is adapted to slidingly pass through the bore 16. The screw plug 22 is then threaded into the mouth of the casing with the usual screw-driver projection on the valve cap or other means (not shown). When the plug has reached the limit of its inward movement within the bore 16, the pin 24 is manually pushed inwardly so as to force the button and the check carried thereby into the intermediate bore 17'. As soon as the check 19 enters the larger bore and the confining pressure on the sides thereof is released, it reassumes its normal flat form and is thereupon adapted to engage against the seat or shoulder 18 to provide the closure for the valve when fluid pressure acts upwardly thereagainst. If desired, a coil spring 27 may be positioned around the valve pin between the top of the plug 22 and the enlargement on the outer end of the pin to urge the valve check against its seat.

In view of the fact that the button 23 below the check 19 has approximately the same diameter as the bore 16, it will be apparent that fluid or other pressure acting upon the button to move it outwardly through the bore 16 will be ineffective of accomplishing this, since the cupping downwardly of the valve check 19 will provide a definite stop against such movement. This condition accordingly provides an abutment for the button when it is desired to apply axial force on the pin in a direction to sever it from the button. This will be apparent from an inspection of Fig. 3 wherein in full lines there is shown the relationship of the valve core parts at the time of severance of the button from the pin when it is desired to replace a defective valve check. In dotted lines in said figure there is shown the severed button dropping downwardly to an inoperative or idle position, which, in view of the enlarged opening through the base of the valve casing, will find its way into the interior of the inner tube. The button having been severed from the pin, the plug 22 and the pin carried thereby may be withdrawn from the casing by further unscrewing the plug and a new valve core or "insides" inserted into the casing.

In the modified form of my invention shown in Figs. 4 and 5, the valve check carrying member is formed of two parts, namely, a socket element 30 and a button 31, which parts, when assembled together, serve to hold the valve check packing 19' and the valve pin 24 in assembled relation.

The socket element 30 consists of a head 32 and a reduced neck 33 with a bore 34 extending axially therethrough, said bore adjacent its top being of substantially semi-spherical form for cooperation with the enlarged ball end 24' on the valve pin to provide a swivel connection between the pin and the valve check carrier. The button 31 consists of a head 35, a reduced neck 36, and an enlarged base 37. The head 35 is preferably of slightly larger diameter than the bore 34 in the socket element and is knurled to provide a severable union between the socket element and the button after said parts are forcefitted together.

The valve check packing 19' consists of a disk of suitable material having an axial extension 19'' of a length to fit within the reduced neck 36 when the packing is mounted on the button 31. Preferably the peripheral wall of the packing 19' is tapered, as shown at 19''', to facilitate the cupping thereof when inserting the valve core in the casing and to further promote the inflation rate when the valve is unseated.

In assembling the valve core parts of Fig. 4, the packing 19' will be first applied onto the button 31, the pin 24 then inserted upwardly through the bore 34 in the socket element 30, after which the button and socket element will be force-fitted together to hold the parts in assembled relation, as shown in Fig. 4.

From the foregoing detailed description it will be evident that I have provided a tire valve with a replaceable core which permits of a very rapid rate of flow of fluid through the valve, plus the desirable qualities of providing a check within the valve and the facility of replacement of the check in the event of failure thereof; and although I have shown certain preferred embodiments of my invention I do not wish to be limited to the details of construction disclosed, since it will be understood and appreciated that modifications thereof may be resorted to by those skilled in the art without departing from the spirit of the invention.

What I claim is:

1. A valve for tires or the like, comprising a casing having a bore therethrough of different diameters, which bore is of smaller diameter at its mouth end than inwardly of said mouth end, a shoulder at the juncture of the portions of the bore of different diameters providing a valve seat, the mouth of the casing being internally screw-threaded and a valve core or "insides" insertable into said casing through its mouth, comprising a screw-threaded plug for engaging the threaded wall of the casing, a pin extending through said plug, a button having a diameter to snugly pass through the mouth of the casing connected to one end of the pin in a manner to be severable therefrom by the application of axial separating force, and a normally flat packing washer on said button of larger diameter than the mouth portion of the bore of the casing adapted to be cupped outwardly to pass through said mouth into the portion of the bore of larger diameter where it can flatten out to seat against the valve seat upon assuming its normal diameter, the packing washer being mounted to cup inwardly around the button to prevent its removal through said valve seat opening when it is sought to withdraw the valve pin through said seat opening, the withdrawal of the plug from the casing after the packing washer is in engagement with the valve seat operating to apply the axial separating force necessary for severing the button from the pin.

2. A valve for tires or the like consisting of a casing having a valve core or "insides" therein, said casing having an integral seat and said "insides" comprising a pin, a valve check carrier mounted on one end of the pin, a deformable check supported by said carrier, said check and carrier being adapted to be passed through the top of the casing to a point below the seat, means for preventing withdrawal of the "insides" as a whole from the casing after said "insides" has been mounted in the casing, and the valve check carrier having a weak connection with the pin and being easily severable therefrom by an axial separating force applied in the direction of withdrawing the "insides" from the casing.

3. A valve for tires or the like according to claim 2, wherein the connection between the pin and the valve carrier consists of a part of one of said elements being lightly turned over a projection on the other element.

4. A tire valve according to claim 2, wherein the connection between the pin and the valve carrier consists of a plug on one of the elements coaxially mounted in a cooperating socket in the other element.

5. A tire valve according to claim 2, wherein the connection between the pin and the valve carrier consists of a plug on one of the elements which is force-fitted into a cooperating socket on the other element.

SELDEN T. WILLIAMS.